(12) United States Patent
Repac et al.

(10) Patent No.: US 6,401,605 B1
(45) Date of Patent: Jun. 11, 2002

(54) DEVICE FOR DICING GARLIC

(75) Inventors: Cedomir Repac, Brechen (DE); Branko Culig, Metlika (SL)

(73) Assignee: Petra Repac, Brechen (DE)

(*) Notice: Subject to any disclaimer, the term of this patent is extended or adjusted under 35 U.S.C. 154(b) by 0 days.

(21) Appl. No.: 09/856,456

(22) PCT Filed: Sep. 6, 2000

(86) PCT No.: PCT/EP00/08674
§ 371 (c)(1),
(2), (4) Date: Jul. 23, 2001

(87) PCT Pub. No.: WO01/24978
PCT Pub. Date: Apr. 12, 2001

(30) Foreign Application Priority Data

Oct. 7, 1999 (DE) .......................... 199 48 168

(51) Int. Cl.[7] .............................. A47J 17/00; A23L 1/00; A23L 1/212; A23P 1/00
(52) U.S. Cl. ............................ 99/538; 99/543; 99/545; 83/437.2; 83/437.4; 83/451; 83/932
(58) Field of Search .................... 99/537–545, 547, 99/555, 556, 588, 643; 83/862, 431, 865, 857, 425.3, 425.7, 620, 932, 437.1, 437.2, 437.4, 451, 407; 30/113.1, 114; 426/302

(56) References Cited

U.S. PATENT DOCUMENTS

| | | | |
|---|---|---|---|
| 343,840 A | * 6/1886 | Opp ........................ 83/437.4 |
| 533,703 A | * 2/1895 | Callahan .................... 83/437.4 |
| 2,500,973 A | * 3/1950 | Ackerman ................ 83/932 X |
| 4,095,518 A | * 6/1978 | Jones .......................... 99/538 |
| 4,436,025 A | * 3/1984 | Jones ...................... 99/537 X |
| 4,569,280 A | * 2/1986 | D'Ambro et al. ......... 83/451 X |
| 5,121,679 A | * 6/1992 | Mertz .......................... 99/538 |
| 5,216,031 A | * 6/1993 | Dobson et al. ........... 99/584 X |
| 5,271,317 A | * 12/1993 | Aguerrevere et al. ......... 99/538 |
| 5,337,480 A | * 8/1994 | Codikow ..................... 30/114 |
| 5,363,756 A | * 11/1994 | Muro ...................... 99/537 X |
| 5,375,512 A | * 12/1994 | Ertmer ........................ 99/538 |
| 5,421,249 A | * 6/1995 | Repisky et al. ............... 99/545 |

FOREIGN PATENT DOCUMENTS

DE 1750135 8/1957
DE 19805933 C1 4/1999

* cited by examiner

Primary Examiner—Timothy F. Simone
(74) Attorney, Agent, or Firm—Charles P. Boukus, Jr.

(57) ABSTRACT

The invention relates to a device for dicing garlic, or similar vegetables. Said device comprises an inner section (2) which has a receiving chamber with a cutting grid (6) located at one end, an upper housing section (3) which can close the other end of the receiving chamber and has a plunger (9) and comprises a housing body (1) with a blade (7), in which the inner section (2) is accommodated in a rotating manner and thread elements which cause the plunger (9) to be driven into and out of the receiving chamber of the rotating section (2) as a result of a twisting motion of the upper housing section (3). The thread elements can be engaged or disengaged using adjustment elements (14).

12 Claims, 5 Drawing Sheets

DEVICE FOR DICING GARLIC

DESCRIPTION

Figure 1:
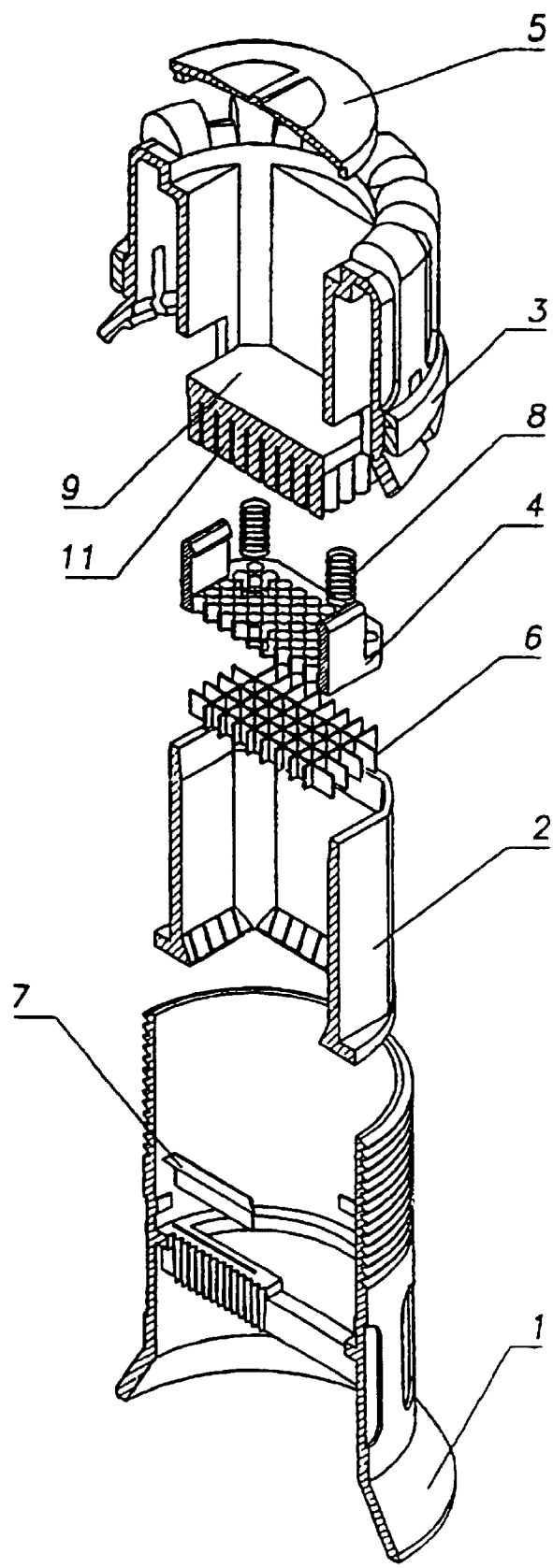

The invention relates to an implement for cutting garlic, onions or similar vegetables, having an inner part which has an accommodating chamber with a cutting grid which is arranged at one end and is intended for the substance which is to be cut, having a top housing part which has a ram and by means of which the accommodating chamber can be closed at the other end, having a housing body which has a blade and in which the inner part is accommodated in a rotatable manner, and having threaded means which, as a result of rotation of the top housing part, allow the ram to move into the accommodating chamber of the co-rotating inner part or move out of the same, it being possible for the threaded means to be engaged or disengaged by means of adjustment means.

DE 198 05 933 C 1 discloses a garlic cutter having the features specified in the introduction. This garlic cutter has a housing body which bears a blade on its underside. Also provided is a top part with a ram fastened thereon, which, in the operating state, executes an axial movement toward a co-rotating cutting grid upon rotation in relation to the housing body. In order that the garlic cutter can be rendered operable more quickly following the filling operation, the fruit is committed without any adverse effect and the garlic cutter can also be quickly reopened and cleaned, an inner body is provided, the latter accommodating the garlic and being mounted in a rotatable manner in the housing body. The inner body has a cutting grid, a ram arranged on a spindle penetrating into the inner body.

The garlic cutter is further equipped with adjustment means which ensure engagement in the spindle in the operating state and allow a free longitudinal displacement of the spindle in the open state. The means are designed as a union nut which is arranged on the housing body and has a mating thread for the spindle. The union nut is fastened on the housing body by means of a bayonet closure. The mating thread is arranged on the inside of a spring ring which, by way of the union nut, is engaged with the thread of the spindle in the operating state and disengaged in the open state. This measure allows the ram to be moved rapidly into the operating position directly above the substance which is to be cut. The union nut is then latched and the ram, by rotation of the top part, is fed to the substance which is to be cut, as a result of which the substance is cut up by the cutting grid and the blade. For rapid opening, the union nut is unlatched again, with the result that the ram can be rapidly removed and the garlic cutter cleaned. Although this garlic cutter has proven very successful in practice, there is a need for further improvement.

The object of the invention is to develop an implement for cutting garlic or similar vegetables, and having the features specified in the introduction, to the extent that, as well as having a construction of straightforward design, it can be handled, as well as cleaned, easily and quickly.

This object is achieved according to the invention, in the case of the implement having the features specified in the introduction, essentially in that the adjustment means is arranged in an axially displace able manner on the top housing part, and engages the threaded means in a first axial position and disengages the threaded means in a second, different axial position.

Since the adjustment means is arranged on the top housing part, this results in a very simplified construction in design terms, handling of the implement being simplified at the same time. In this respect, it should also be emphasized that the adjustment means is actuated in the axial direction, which further benefits the handling. For operating and for opening the implement, the adjustment means can be displaced extremely easily in the axial direction respectively from the second axial position into the first axial position and vice versa, as a result of which the threaded means are either engaged or disengaged. If the threaded means are engaged, the ram can be moved, by straightforward rotation of the top housing part, in the direction of the substance which is to be cut. If the implement is to be opened following completion of the cutting operation, the adjustment means is transferred, by straightforward axial displacement, into the second position, with the result that the ram can be drawn off from the implement together with the top housing part. Conversely, for cutting the substance located in the accommodating chamber, the ram is introduced with the top housing part into the accommodating chamber, with the adjustment means located in the second position, until the ram is positioned directly above the substance which is to be cut. The adjustment means is then transferred from the second axial position to the first axial position and the top housing part is made to rotate, whereupon the ram is moved in the direction of the substance which is to be cut and said substance is cut up into cubes by means of the cutting grid and of the blade, which rotate relative to one another.

A first advantageous configuration of the invention is distinguished in that the second axial position of the adjustment means is arranged closer to the head of the top housing part than the first axial position. It is precisely for the purpose of cleaning the implement that this measure has proven particularly favorable from the point of view of economics since the user, by subjecting the top housing part to a pulling force, transfers the adjustment means as it were automatically from the first axial position to the second axial position and disengages the threaded means, with the result that the top housing part together with the ram can be removed easily from the implement. Conversely, once the accommodating chamber has been filled with the substance which is to be cut, the top housing part is introduced into the accommodating chamber together with the ram by virtue of a pushing force being exerted, whereupon the adjustment means is transferred once again more or less automatically from the second position into the first axial position, in which the threaded means engage with one another.

According to another advantageous configuration, the top housing part grips over the housing body, the threaded means being formed by an internal thread of the top housing part and an external thread of the housing body. This measure results in an extremely straightforward construction of the implement according to the invention which, in addition to the adjustment means, has just three separate parts.

It has also proven extremely advantageous for the adjustment means to ensure the engagement of the internal thread in the external thread in the first position and to allow a longitudinal displacement of the top housing part in relation to the housing body in the second position. This measure makes it possible, once the accommodating chamber has been filled, for the top housing part to be transferred rapidly into an operating position in which the ram is arranged directly above the substance which is to be committed. The adjustment means is then transferred into the first position, in which the internal thread and external thread engage with one another, as a result of which, upon rotation of the top housing part, the ram is introduced further into the accommodating chamber and the substance which is to be committed is cut up by the cutting grid and the blade.

A configuration of the adjustment means which is particularly straightforward in design terms is achieved in that the housing wall of the top housing part is formed, in the region of the internal thread, by in particular slightly outwardly oriented, preferably resiliently elastic lugs. This measure makes it possible for the threaded means to be engaged with one another by virtue of the lugs being pivoted inward and disengaged by virtue of the lugs being pivoted outward.

According to another extremely advantageous configuration of the invention, the adjustment means is designed as a ring which is guided on the top housing part, grips over the lugs, and presses them inward in the direction of the external thread, in the first axial position, and allows the lugs to pivot outward in the lateral direction in a second axial position. If the ring is located in the first position, then the internal thread and external thread are engaged with one another and, rather than being axially displace able freely on the housing body, the top housing part and the ram can only be moved forward axially via a rotary movement. If the ring, however, is located in the second axial position, the internal thread and external thread are disengaged, with the result that the top housing part is arranged in a freely displace able manner on the housing body without any rotary movement being required for this purpose. In this respect, the top housing part or the ram can be moved rapidly in the axial direction when the ring is located in the second position.

The adjustment means can be secured, for example latched, on the top housing part at least in one axial position, preferably in both axial positions. This measure ensures that the adjustment means is not transferred unintentionally from one axial position to the other axial position.

The rotatable mounting of the inner part within the housing body is influenced positively in that the cross-sectional profile of the inner part corresponds, at least in certain areas, with the cross-sectional inner profile of the accommodating means of the housing body, with the result that the outer wall of the inner part is supported, at least in certain areas, on the inner wall of the accommodating means of the housing body.

In this case, the accommodating chamber of the inner part advantageously has a non-round cross-sectional profile.

The top housing part advantageously has a ram with a non-round outer profile which is adapted non-round cross-sectional profile of the accommodating chamber of the inner part, the ram penetrating into the accommodating chamber. By virtue of this measure, on account of rotation of the top housing part, the inner part and the cutting grid are also made to rotate, it being the case that, as rotation of the top housing part continues, the ram of the top housing part is simultaneously pressed deeper and deeper into the accommodating chamber of the inner part and thus pushes through the cutting grid the substance which is located in the accommodating chamber, with the result that the substance is further committed by the fixed blade.

The ram and the accommodating chamber preferably have an essentially rectangular, preferably a square, cross-sectional profile, it being possible for the corner regions of the two profiles to be rounded slightly for the purpose of easy cleaning.

The construction of the implement, which is a straightforward design, is benefited in that the inner part and/or the housing body and/or the top housing part are designed in one piece.

Figure 2:
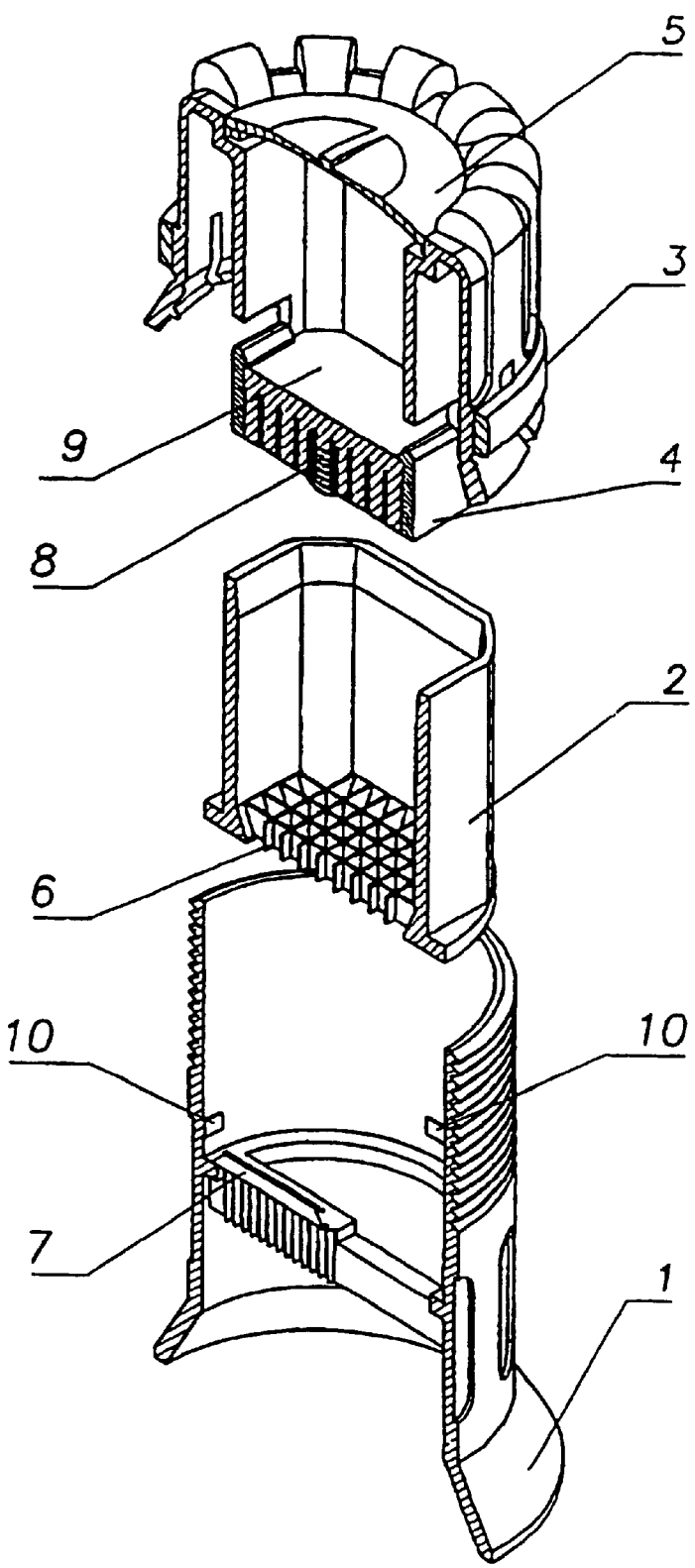
Figure 3:
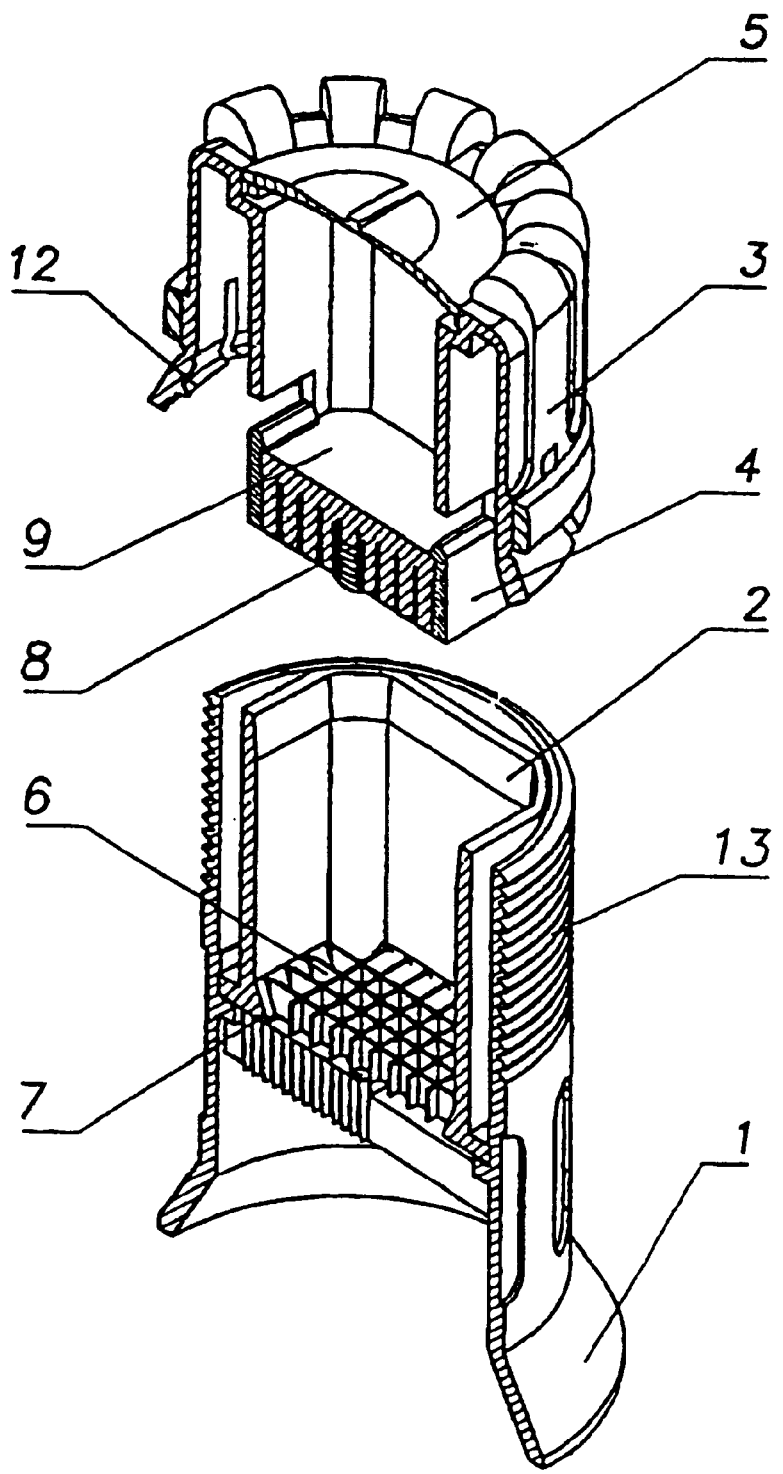
Figure 4:
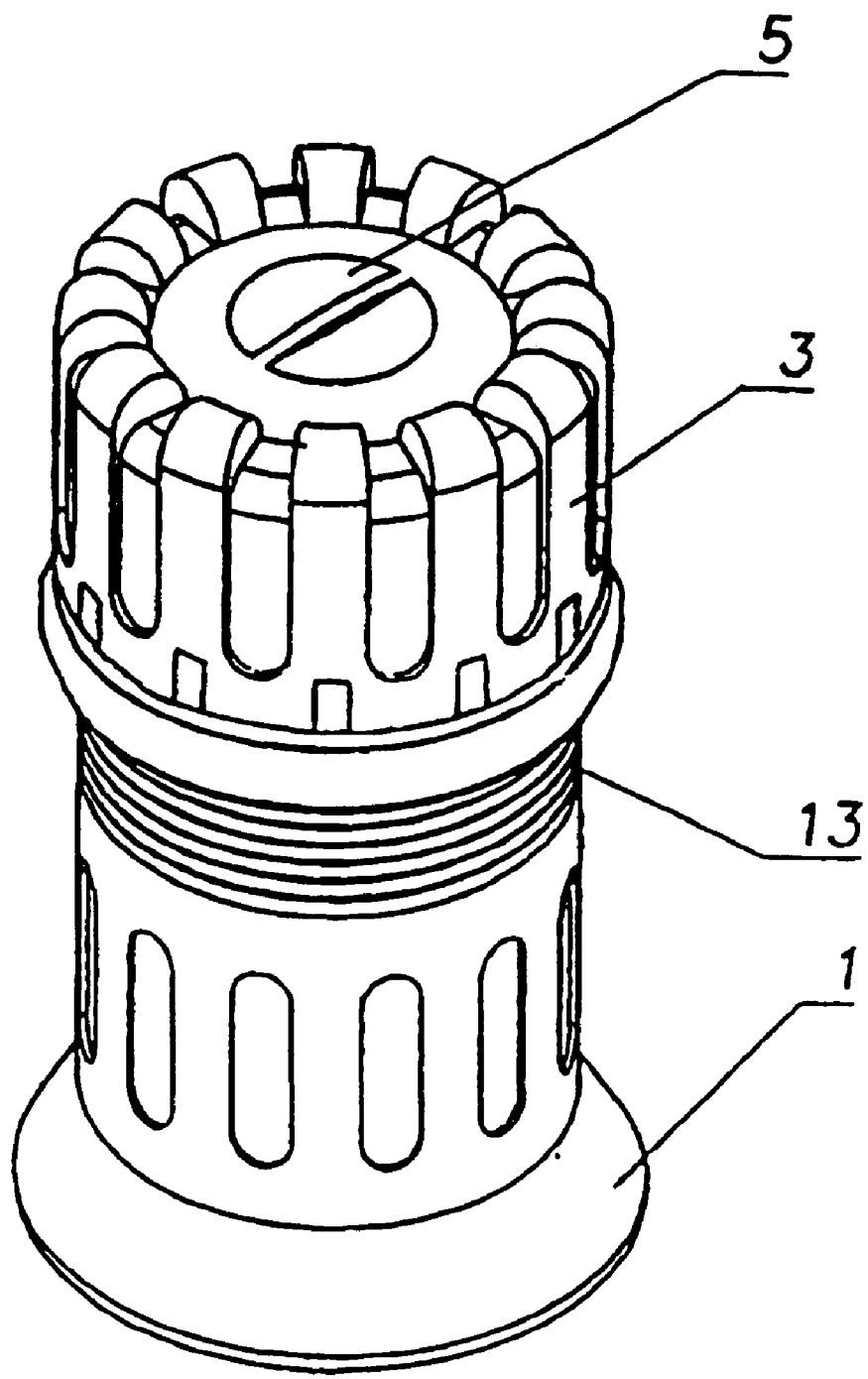
Figure 5:
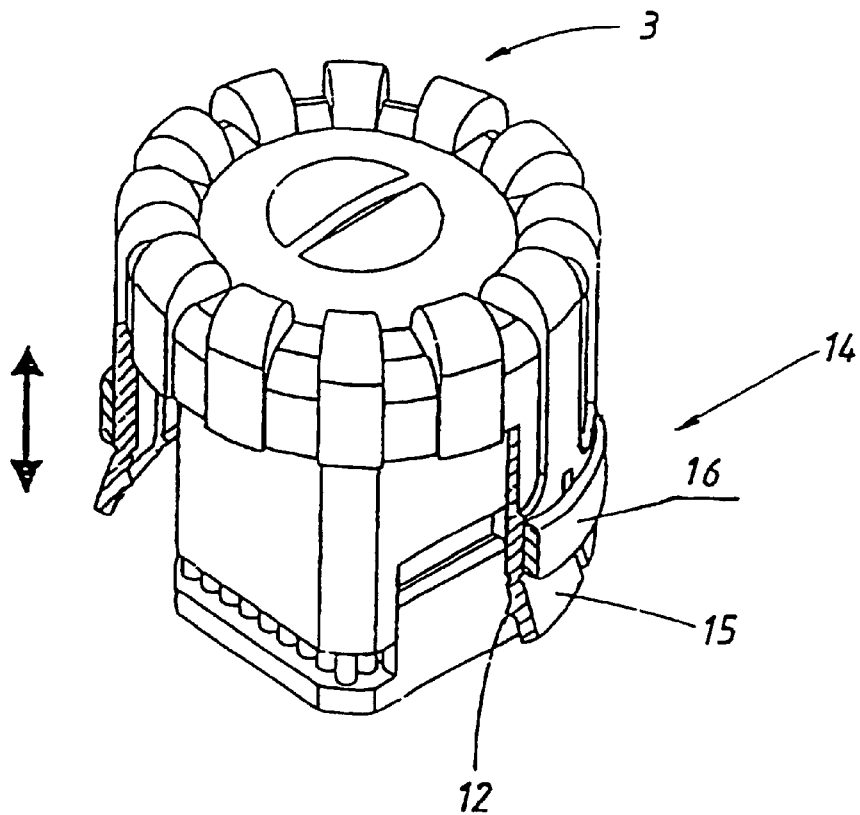
Figure 6:
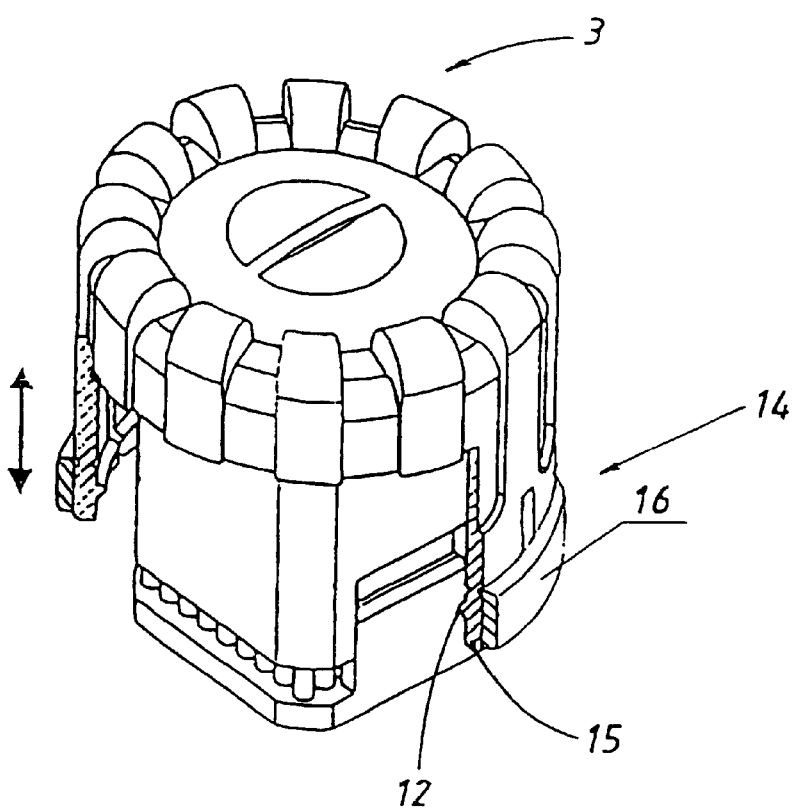

Further advantages and possible applications of the present invention can be gathered from the following description of an exemplary embodiment with reference to the drawing, in which:

FIG. 1 shows a perspective view of the individual parts of a garlic cutter according to the invention in the manner of an exploded drawing, FIG. 2 shows the garlic cutter dismantled for cleaning purposes, FIG. 3 shows the refinement from FIG. 2 in the filling state, FIG. 4 shows the garlic cutter in the assembled state, and FIG. 5 shows the top housing part according to FIG. 1 with adjustment means located in the unlocking position for axial displacement of the top housing part in relation to the housing body, and FIG. 6 shows the top housing part according to FIG. 1 with adjustment means located in the locking position.

FIG. 1 shows individual parts of a garlic cutter in a sectional and exploded illustration. It is possible to see, as the main elements, the housing body 1, into which the cup-like inner part 2 can be inserted, and the top housing part 3. The plate 4 and the top cover 5 are fastened on the top housing part 3. The cutting grid 6 is inserted into the inner part 2; and the blade 7 is inserted into the housing body 1. The springs 8 may be positioned on some of the pins 11 of the ram 9. The plate 4 has two upwardly directed arms with inwardly directed hooks which, in the assembled state, grip around the ram 9. The springs 8 then press the plate 4 away from the ram 9, while the hooks of the plate 4 retain the same on the ram 9.

FIG. 2 shows the individual parts of FIG. 1 in a ready-to-use state, for instance how the garlic cutter is dismantled for example for cleaning purposes, that is to say into the three main components of housing body 1 with blade 7 inserted, inner part 2 with cutting grid 6 inserted and top housing part 3 with top cover 5, ram 9, springs 8 and plate 4. It is also possible to see here the noses 10 arranged somewhat above a metal ring (not illustrated separately) which serves as a sliding element for the inner part 2. If the inner part 2 is thus pushed out of the position shown in FIG. 2, beyond the noses 10, into the housing body 1, the inner part 2 then rests on the ring in the housing body 1. The noses 10 prevent the inner body 2 from slipping out in the upward direction. The inner part 2 is then thus mounted in a rotatable manner, but such that it is secured against dropping out, within the housing body.

FIG. 3 shows the garlic cutter according to the invention in the open state, that is to say in the state in which it is ready for filling. The inner part 2 in this case, as has just been described, is inserted into the housing body 1. The cutting grid 6 is located precisely above the blade 7. The garlic or the other vegetables which are to be committed is/are then positioned in the cup-like interior of the inner body 2 and are thus located on the cutting grid 6. For comminuting the garlic, the top housing part 3 with its ram 9 is then inserted into the interior of the inner body 2. Upon rotation of the top part 3, the inner part 2, with garlic and cutting grid 6, is likewise made to rotate. In contrast the blade holder with the blade 7 is fixed in relation to the housing body 1.

If the top housing part 3 is then pushed downward and rotated further, the internal thread 12 arranged on the bottom outer border of the top part 3 (in this case only one turn is depicted) grips in the external thread 13 of the housing body. As a result, the top housing part 3 screws slowly downward and presses the garlic, which is located beneath the ram 9 and above the cutting grid 6, through the cutting grid 6. As a result, fine strips of garlic are produced in the cutting grid 6, and these strips, upon rotation of the cutting grid 6, are cut into small cubes via the blade 7.

As can be gathered, in particular, from FIG. 1, the ram 9 has a multiplicity of pins 11, which are assigned a plate 4 which contains as many holes as there are pins 11. The plate 4 may be fastened on the ram 9 via two clamps, as shown in FIG. 2. Also shown in FIG. 1 are two (of five) springs 8 which press the plate 4 away from the ram 9. It is only when the plate 4 comes into contact with the cutting grid 6 at the end of the pressing operation that the plate 4 is stopped by the grid and pushed against the ram 9. The springs 8 compress and the pins 11 begin to project beyond the plate 4. They extend through the openings of the cutting grid 6 and thus also push the last residues of garlic through the grid 6 toward the blade 7 rotating there beneath. In this pressed end state, the top hooks of the clamps are raised off from the ram 9. If the user opens the garlic cutter or screws the top housing part 3 with the ram 9 upward again, the springs 8 press the plate 4 downward again, this producing a more or less planar surface, formed from the plate 4 and the front sides of the pins 11, which can be easily cleaned again.

FIG. 4 shows the garlic cutter in the assembled state. It is possible to see the top housing part 3 with the top cover 5, which is screwed onto the external thread 13 of the housing body 1. The housing body 1 has a widened foot in order to increase its stability.

FIGS. 5 and 6 illustrate in detail the adjustment means 14, which are arranged on the top housing part 3 and ensure the engagement of the internal thread 12 in the external thread 13 in the first position and allow a longitudinal displacement of the top housing part 3 in relation to the housing body 1 in a second position. The housing wall of the top housing part 3 is formed, in the region of the internal thread 12, by slightly outwardly oriented resiliently elastic lugs 15.

Guided on the top housing part 3 is a ring 16 which grips over the lugs 15, and presses them inward in the direction of the external thread 13, in a first axial position (FIG. 6), and allows the lugs to pivot outward in the lateral direction in a second axial position (FIG. 5). If the ring 16 is located in the position according to FIG. 5, the top housing part 3 can be displaced freely in the axial direction on the housing body 1 since the internal thread 12 and external thread 13 are not engaged with one another. If, however, the ring 16 is located in the position illustrated in FIG. 6, the resiliently elastic lugs 15 with the internal thread 12 are pressed into the external thread 13 of the housing body 1, with the result that the top housing part 3 and the ram 9 can then only be moved on in the axial direction by a rotary movement of the top housing part 3. The ring 16 can be secured or fixed on the top housing part 3 in at least one axial position, preferably in both axial positions, by securing means, latching means or the like, with the result that unintentional displacement of the ring 16 out of one position into the other position is avoided.

LIST OF DESIGNATION

1 Housing body
2 Inner body
3 Top housing part
4 Plate
5 Top cover
6 Cutting grid
7 Blade
8 Springs
9 Ram
10 Noses
11 Pins
12 Internal thread
13 External thread
14 Adjustment means
15 Lugs
16 Ring

What is claimed is:

1. An implement for cutting garlic, onions or similar vegetables, having an inner part (2) which has an accommodating chamber with a cutting grid (6) which is arranged at one end and is intended for the substance which is to be cut, having a top housing part (3) which has a ram (9) and by means of which the accommodating chamber can be closed at the other end, having a housing body (1) which has a blade (7) and in which the inner part (2) is accommodated in a rotatable manner, and having threaded means which, as a result of rotation of the top housing part (3), allow the ram (9) to move into the accommodating chamber of the corotating inner part (2) or move out of the same, said threaded means being engaged or disengaged by means of adjustment means (14), characterized in that the adjustment means (14) is arranged in an axially displace able manner on the top housing part (3), and engages the threaded means in a first axial position and disengages the threaded means in a second, different axial position.

2. The implement as claimed in claim 1, characterized in that the second axial position of the adjustment means (14) is arranged closer to the head of the top housing part (3) than the first axial position.

3. The implement as claimed in claim 1, characterized in that the top housing part (3) grips over the housing body (1), the threaded means being formed by an internal thread (12) of the top housing part (3) and an external thread (13) of the housing body (1).

4. The implement as claimed in claim 1, characterized in that the adjustment means (14) ensures the engagement of the internal thread (12) in the external thread (13) in the first position and allows a longitudinal displacement of the top housing part (3) in relation to the housing body (1) in the second position.

5. The implement as claimed in claim 1, characterized in that the housing wall of the top housing part (3) is formed, in the region of the internal thread (12), by slightly outwardly oriented, resiliently elastic lugs (15).

6. The implement as claimed in claim 1, characterized in that the adjustment means (14) is designed as a ring (16) which is guided on the top housing part (3), grips over the lugs (15), and presses them inward in the direction of the external thread (13), in the first axial position, and allows the lugs (15) to pivot outward in the lateral direction in the second axial position.

7. The implement as claimed in claim 1, characterized in that the adjustment means (14) can be secured in at least one axial position, or in both axial positions.

8. The implement as claimed in claim 1, characterized in that the cross-sectional outer profile of the inner part (2) corresponds, at least in certain areas, with the cross-sectional inner profile of the accommodating means of the housing body (1), with the result that the outer wall of the inner part (2) is supported, at least in certain areas, on the inner wall of the accommodating means of the housing body (1).

9. The implement as claimed in claim 1, characterized in that the accommodating chamber of the inner part (2) has a non-round cross-sectional profile.

10. The implement as claimed in claim 1, characterized in that the top housing part (3) has a ram (9) with a non-round outer profile which is adapted to the non round cross-sectional profile of the accommodating chamber of the inner part (2), the ram (9) penetrating into the accommodating chamber.

11. The implement as claimed in claim 1, characterized in that the ram (9) and the accommodating chamber essentially have a rectangular, or square, cross sectional profile.

12. The implement as claimed in claim 1, characterized in that the inner part (2) and/or the housing body (1) and/or the top housing part (3) are designed in one piece.

* * * * *